United States Patent Office 3,684,441
Patented Aug. 15, 1972

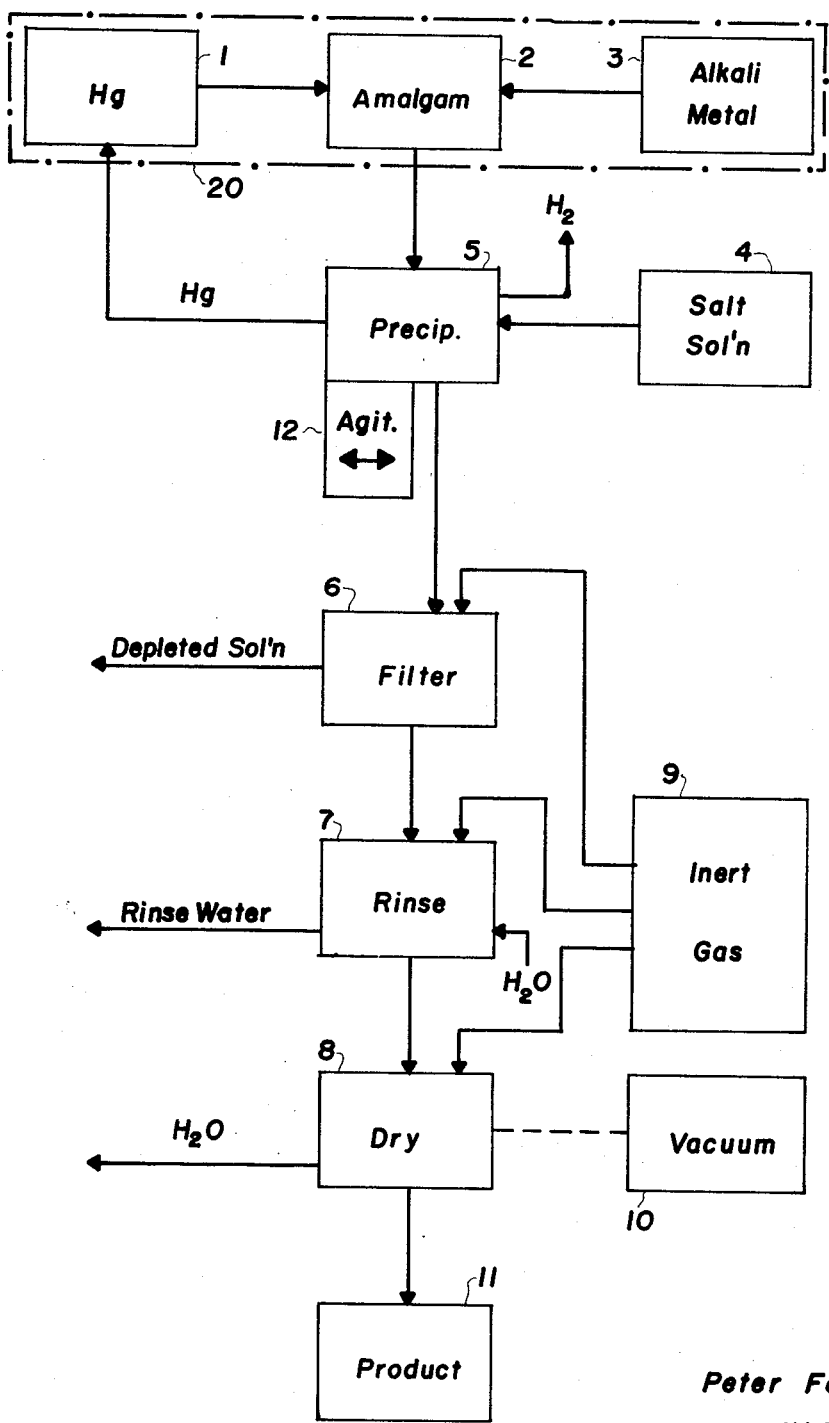

3,684,441
PROCESS FOR MAKING NICKEL (II) HYDROXIDE, ESPECIALLY FOR USE IN ELECTRODES
Peter Faber, Kahl am Main, Germany, assignor to Rheinisch-Westfalisches Elektrizitatswerk Aktiengesellschaft, Kruppstrasse, Essen, Germany
Filed June 22, 1970, Ser. No. 47,956
Claims priority, application Germany, July 1, 1969,
P 19 33 252.6; July 29, 1969, P 19 38 443.1
Int. Cl. C01g 53/04, 49/02; C22b 23/00
U.S. Cl. 423—592    11 Claims

ABSTRACT OF THE DISCLOSURE

A method for producing the divalent hydroxide of nickel or of iron by reacting a salt of these metals in water solution with a member of the alkali and alkaline-earth metal groups added in the metallic state or in the form of a slightly soluble (in water) intermetallic compound, especially an amalgam of mercury. One of the products of such a reaction is the desired nickelous or ferrous hydroxide in the form of a precipitate which may be filtered, washed and powdered for further use, e.g. in the production of electrodes for electric storage batteries.

(1) FIELD OF THE INVENTION

The present invention relates to a method of preparing pure nickelous and ferrous hydroxides.

(2) BACKGROUND OF THE INVENTION

In the manufacture of basic (alkaline) electric storage batteries or accumulator such as those of the nickel/cadmium and nickel/zinc types, the plates associated with the positive electrode can be formed from the divalent hydroxide of nickel ($Ni(OH)_2$) with the possible admixture of some pure nickel. The raw material used in the manufacture of these electrodes must show an extremely high degree of chemical purity since the presence of even small quantities of alien material can poison the electrochemical activity of the finished electrode. Similarly iron hydroxide and iron oxide plates may be employed in electrochemical devices.

The method currently practiced for the production of the divalent nickel and iron hydroxides, the two compounds being very similar in structure, properties and utility, principally rely on the precipitation of the product from an aqueous solution of some other divalent salt, preferably the nitrate; the precipitating agent being caustic soda (sodium hydroxide).

The above reaction is described by the equation

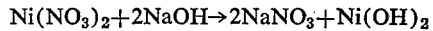

$$Ni(NO_3)_2 + 2NaOH \rightarrow 2NaNO_3 + Ni(OH)_2$$

in which the sodium nitrate product goes into solution and the nickelous hydroxide precipitates as a gelatinous flocculant precipitate with an apple-green color. Because of the nature of the precipitate, the filtration and purification (by flushing the precipitated mass with water or other suitable liquid) is very difficult. Of particular concern are carryovers of the nickel and sodium nitrates and the nickel carbonates, $NiCO_3$ and $Ni(OH)_2CO_3$, produced by reaction with the carbonates present in small quantities in the caustic soda or resulting from pick-up of $CO_2$ from the air.

To prevent the degradation of the product, the removal of these impurities is required and a large number of purification processes have been proposed and used. These include the use of solutions at high temperatures or high concentrations; the order of adding the several components to the reaction and their relative concentrations may be changed; the precipitate is washed with one method and dried in another. All of these, in the final analysis, rely on the reaction of a nickelous salt with caustic soda and limit themselves to the amelioration of the undesirable feature of this approach.

Another approach to the production of these hydroxides is by their precipitation through electrochemical action. This is only possible at a very low rate or in the interstices of a porous matrix. The advantage of the system is the production, from an aqueous solution of a divalent metallic salt, of a carbonate-free precipitate which is readily freed by ionophoretic action from impurities. Hydroxides prepared by the electrochemical method yield excellent performance when used in battery electrodes, approaching the theoretical limit. The method has not, however, any practical application in the production of industrial quantities at an economically justifiable cost.

(3) OBJECTS OF THE INVENTION

It is therefore an object of the invention to provide a novel method for the preparation of the nickelous and ferrous hydroxides avoiding the presence of deleterious impurities in the product.

It is another object of the invention to provide an improved method of making nickel and iron compounds for use in alkaline accumulators, especially where lamination of the active material by carbonates is a problem.

Another object of the invention is to provide a low-cost efficient method of making impurity-free divalent nickel and iron hydroxide.

(4) SUMMARY OF THE INVENTION

The object is achieved, in accordance with the invention, by precipitating the desired product from a (preferably slightly acid solution) of a divalent salt of the parent metal, nickel or iron, by an amalgam of mercury with one of the alkali metals or alkaline-earth metals. Amalgams of sodium, potassium and lithium are particularly suitable for this purpose as is the amalgam of calcium with mercury. The alkaline earth metals, such as calcium, may also be used directly in the absence of mercury.

The reaction involves the reduction of the divalent metal salt by the alkali metal and the subsequent formation of the hydroxide with the evolution of hydrogen gas. The use of mercury amalgams of the reducing metals helps to prevent unwanted side reactions by these very reactive substances.

The equation for the process may be written as:

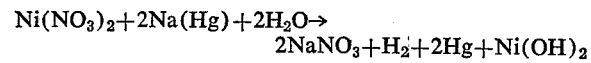

$$Ni(NO_3)_2 + 2Na(Hg) + 2H_2O \rightarrow 2NaNO_3 + H_2 + 2Hg + Ni(OH)_2$$

where the starting material is nickel nitrate and the sodium metal serves as the reducing agent.

A considerable economic advantage associated with my present invention is the ready availability of the alkali metal amalgams, especially that of sodium, from conventional electrolytic processes, e.g. the production of chlorine.

Because of the nature of the reaction the pH of the solution may be adjusted to make it slightly acidic (pH 5–6.95) without affecting the process, thus suppressing formation of carbonates and eliminating a major source of contaminant. When the precipitate is formed in boiling solution it is readily filtered and washed to remove any remaining nitrates. The direct use of an alkaline-earth metal, such as calcium, requires close control since any excess of reagent will precipitate in the form of an almost insoluble hydroxide and require washing with boiling distilled water (freed from $CO_2$ and contaminating salts). There is further inconvenience in the fact that the alkali earth hydroxides, when wet, readily react with carbon dioxide in the atmosphere and form carbonates that are nearly insoluble even in hot water.

It is preferable to cause precipitation, in the process of my invention, at relatively low temperatures, of the order of 10 to 15° C. Since the overall chemical reaction is slightly exothermic, heat may be generated at high concentrations and it is then advantageous to cool the solution during the reaction.

The formation of a fine and uniform precipitate, advantageous from the point of view of filtering and processing, may be promoted by vigorous mixing of the solution by agitation, vibration or under the influence of a supersonic vibration field.

As a further safeguard against the presence of carbonates in the final product the drying of the washed precipitate should be performed under a blanket of inert gas such as carbon dioxide free air or nitrogen. The optimum drying temperature lies below 80° C., preferably between 70 and 75° C. Drying may be also done under a vacuum; in this case the temperature may be lowered to the range between 30° C. and 60° C.

After the drying the product is ground into a fine powder and may be directly applied in the manufacture of electrodes for storage batteries e.g. in admixture with nickel-metal powder, after sintering or high-pressure pressing.

(5) DESCRIPTION OF THE DRAWING

The invention is described in greater detail with reference to the sole figure of the accompanying drawing, which represents a block diagram of the method of the present invention and with reference to subsequent specific examples.

(6) SPECIFIC DESCRIPTION

It has already been noted that the alkali metal or alkaline-earth metal amalgam of the present invention may derive from a process for the electrolytic recovery of the halogens or the alkali metals or alkaline-earth metals themselves. Such processes, represented generally at 20 in the drawing, include processes for the production of chlorine in mercury cells (see pages 183 ff. of the Encyclopedia of Electrochemistry, Reinhold Publishing Corporation, New York, 1964).

As shown in the drawing, mercury is supplied from a container 1 to a mixing chamber 2 which also receives the alkali metal reducing agent from a container 3. The resulting amalgam is channeled to a precipitation chamber 5 into which the nickelous, or ferrous, salt solution is fed from a tank 4. The contents of precipitation chamber 5 are mixed by means of an agitator 12. A filter 6 removes the nickelous (ferrous) hydroxide particles from the depleted solution and the precipitate is washed in a rinsing tank 7, dried in a chamber 8 and transfered to a product bin 11. To prevent the formation of carbonates during the processing of the precipitate, the filter 6, the rinsing tank 7 and the drying chamber 8 are provided with means for blanketing their contents in an inert gas supplied from a tank 9. The drying chamber 8 may alternately be provided with means for creating a vacuum above the heated precipitate, the atmosphere being pumped out by a vacuum pump 10.

(7) SPECIFIC EXAMPLES

Example I

An aqueous solution of divalent nickel nitrate is prepared with the salt concentration in the range of 5 to 10 to 70 weight percent (pH adjusted to 6.9 with $HNO_3$). A mercury solution of sodium metal (amalgam), with a concentration range of 5 to 10 weight percent sodium is decanted into the nickel nitrate solution (mixed with a paddle-type stirrer) whose temperature is maintained in the 10 to 15° C. range.

The resulting green precipitate is filtered (beneath $N_2$) from the solution and thoroughly washed with distilled water, finally rinsed with ethyl alcohol free of water, dried at a temperature of 70 to 75° C. and ground into a fine powder.

Example II

A liquid alkali-metal (potassium) amalgam of mercury containing approximately 4 weight percent of the alkali, similar to the solutions obtained from chlorine/alkali electrolytic cells, is mixed with concentrated, 50 weight percent, aqueous solution of divalent nickel nitrate at a temperature of 10 to 15° C. vibrated at 10 kc./sec. The very fine precipitate formed in the solution is filtered under $CO_2$-free air and washed with boiling water to which approximately 1 weight percent of caustic soda has been added. It is washed for a second time with boiling distilled water and dried in a chamber connected to water-driven venturi pump to maintain a vacuum of approximately 10 mm. mercury absolute at a temperature of the filtrate of 60° C. The dried powder is further ground to the required finess.

Example III

The amalgam of lithium with mercury formed in an electrolytic cell used in the reduction of lithium salts with quick-silver is decanted into a saturated water solution of nickelous sulfate ultrasonically agitated at 30 kc./sec.

The nickelous salt solution is maintained at 10 to 15° C. and is degassed by boiling prior to the addition of the lithium amalgam. The precipitate is filtered from the solution, washed in cold water, heated to 70–75° C. for drying and pulverized.

The nickel products obtained from the foregoing examples are incorporated in electrodes as described in my Pat. No. 3,436,267 for use in conjunction with cadmium or zinc counterelectrodes. In all cases, the plates are found to be highly effective and to be free from the disadvantages of plates made by the precipitation of nickel hydroxides with sodium hydroxide solutions.

Example IV

The system of Example I was used except that the divalent iron nitrate was substituted for the nickel nitrate. The resulting iron hydroxide was found to be effective as the active material of a battery.

I claim:

1. A method of making high-purity nickel (II) hydroxide substantially free from carbonate, comprising the steps of precipitating the nickel (II) hydroxide from an aqueous solution of a divalent nickel salt, adjusted to a slightly acidic pH, by adding to said solution a mercury amalgam of an element selected from the group which consists of alkali metals and alkaline earth metals; and recovering the precipitate from said solution.

2. The method defined in claim 1 wherein said element is selected from the group which consists of calcium, sodium, potassium, and lithium.

3. The method defined in claim 2 wherein said solution is held at a temperature in the region of its boiling point during precipitation.

4. The method defined in claim 2, further comprising the step of maintaining said solution at a temperature between 10 and 15° C. during precipitation.

5. The method defined in claim 2, further comprising the step of agitating said solution during the precipitation of the nickel hydroxide therefrom.

6. The method defined in claim 2 wherein said precipitate is separated from said solution by filtering the precipitate therefrom under a carbon-dioxide-free protective gas.

7. The method defined in claim 6, further comprising the step of drying the precipitate at a temperature below 80° C.

8. The method defined in claim 7 wherein said precipitate is dried under vacuum.

9. The method defined in claim 8 wherein said precipitate is dried at a temperature between 30 and 60° C.

10. The method defined in claim 2 wherein said solution has an acidic pH and is boiled prior to precipitation, further comprising the steps of passing carbon-dioxide-free hydrogen through the solution during the boiling thereof, and washing the precipitate with carbon-dioxide-free hot water.

11. The method defined in claim 2 wherein said solution is treated with an alkali-metal amalgam deriving from an electrolysis plant using mercury cells.

References Cited

UNITED STATES PATENTS

| | | | |
|---|---|---|---|
| 2,879,137 | 3/1959 | Bare et al. | 23—183 |
| 2,950,172 | 8/1960 | Pincott et al. | 23—183 |
| 1,736,072 | 11/1929 | Duschak | 75—109 |
| 2,687,951 | 8/1954 | Whaley | 75—109 X |
| 3,436,267 | 4/1969 | Faber | 23—183 X |

FOREIGN PATENTS

| | | | |
|---|---|---|---|
| 577,092 | 6/1959 | Canada | 75—108 |

EARL C. THOMAS, Primary Examiner

G. ALVARO, Assistant Examiner

U.S. Cl. X.R.

423—395, 633; 75—109, 119; 136—29